United States Patent Office
2,950,326
Patented Aug. 23, 1960

2,950,326

HYDROGENATION OF 1,4-BUTYNEDIOL TO 1,4-BUTANEDIOL

Eugene V. Hort, Westfield, N.J., assignor to General Aniline & Film Corporation, New York, N.Y., a corporation of Delaware No Drawing. Filed Dec. 31, 1957, Ser. No. 706,251

4 Claims. (Cl. 260—635)

This invention relates to the catalytic hydrogenation of 1,4-butynediol, hereinafter referred to as butynediol, to 1,4-butanediol, hereinafter referred to as butanediol.

The hydrogenation of butynediol to butanediol in the presence of a number of different catalysts and by a number of different procedures is known. However, such previously proposed processes have been deficient for a number of reasons, including the production of butanediol in relatively lower yields and/or lower quality, the necessity for using specially prepared or poisoned catalysts, high pressures, careful control to avoid production of undesirable by-products and/or the like. A nickel catalyst has been successfully employed in such a process, but this process likewise requires the use of very high pressures of the order of 200 or more atmospheres.

It is an object of this invention to provide a hydrogenation process for the reduction of butynediol to butanediol which is not subject to the above disadvantages. Another object of this invention is the provision of a process for the hydrogenation of butynediol to butanediol in the presence of a nickel catalyst at relatively low temperatures and pressures without substantial detriment to the yields of the desired product and/or without the simultaneous production of any substantial amounts of undesirable by-products which would reduce the quality and yield of product desired. Other objects and advantages will appear as the description proceeds.

The attainment of the above objects is made possible by the instant inventive process for the catalytic hydrogenation of butynediol to butanediol comprising treating an aqueous alkaline solution of butynediol with hydrogen at a temperature of about 15 to 120° C. and a pressure of about 0 to 30 atmospheres gauge in the presence of a nickel catalyst which may, if desired, carry about 3 to 25% by weight thereof of copper. It has been found that the instant process enables the attainment of a purer butanediol in addition to large savings in cost of operation and equipment because of the relatively low pressures which may be employed.

The concurrent use of copper in the above defined process has little or no effect on the activity of the nickel catalyst for hydrogenation but acts to increase yields and suppress isomerization during the process which would tend to produce by-products having a detrimental effect upon the quality and yield of the desired butanediol. The catalyst maintains its activity much longer, possibly because of the lowering of the formation of by-products, including gamma-hydroxybutyraldehyde, tertahydrofurane, dihydrofurane, propionaldehyde, and the like, and the poisoning produced thereby, and may accordingly be reused repeatedly.

In carrying out the process of this invention, an aqueous butynediol solution is prepared at a pH of about 7.5 to 12, preferably about 10.5 to 11.5. Concentrated solutions are preferred, an aqueous solution having a concentration of at least about 20% up to 80% or more, and preferably 35 to 40%, having been found highly advantageous and convenient. Such solutions are available commercially at a pH of about 2.5 to 6, and must be adjusted to the aforementioned alkaline pH range by addition of a base, preferably an alkali metal hydroxide such as sodium or potassium hydroxide. It is important that the hydrogenation be carried out as soon as possible (preferably immediately) after such adjustment of the pH because alkaline solutions of butynediol are not stable and gradually decompose to give progressively lower yields of the desired butanediol on hydrogenation. Instead of the aforementioned bases, other strong bases may be employed for adjustment of the alkalinity, including generally metal, alkali metal, alkaline earth metal oxides and hydroxides, and quaternary ammonium hydroxides, such as the oxides and hydroxides of lithium, magnesium and barium, and the tetramethyl, benzyl trimethyl, phenyl trimethyl ammonium, and N-methyl pyridinium hydroxides and the like.

The nickel catalyst employed in the process of this invention is preferably maintained in the aqueous butynediol reaction medium in finely divided form. A Raney-type nickel catalyst is preferred as yielding optimum results (such catalysts are described in U.S. Patent No. 1,638,190). This type of catalyst is readily prepared by treating an aluminum-nickel alloy with caustic soda to dissolve out the aluminum and leave the nickel in a highly divided and particularly effective form. The amount of nickel catalyst employed will generally range from about 0.1 to 10%, and preferably from about 0.5 to 3% by weight of the butynediol, but such amount is not critical since the catalyst is not deactivated during the hydrogenation and may be reused. For a given amount of butynediol to be hydrogenated, the rate of hydrogenation will vary directly with the amount of catalyst employed.

In accordance with the instant process, further improved results and advantages are obtained when the nickel catalyst contains dispersed thereon about 3 to 25% of copper by weight of the nickel catalyst, preferably as deposited from a soluble or dispersible copper compound. A water soluble copper compound is preferably added to the aqueous butynediol-nickel catalyst system, particularly the copper salts of strong acids such as copper sulfate, copper chloride, and copper nitrate, and the copper salts of weak acids such as copper cyanide, copper formate, copper acetate and copper carbonate. Copper oxide may also be used. The nickel replaces the copper from the solution and any residual soluble copper is reduced during the hydrogenation. The precipitated copper is dispersed or coated on the nickel catalyst. Higher proportions of copper should be employed with lower pH values within the above ranges.

The hydrogenation of the butynediol in the reaction medium is carried out by maintaining an atmosphere of hydrogen over the surface of the reaction medium, contact therewith being facilitated by agitation as by rocking or shaking the reaction vessel, or by stirring the reaction medium with a high speed propeller or the like. Within the defined temperature range, use of a lower temperature yields a product of higher quality, but the reaction rate is lower. The optimum temperature range is about 30 to 60° C.

The greatest advantages of the instant process including better yields and the like, are exhibited at pressures ranging from atmospheric to about 10 atmospheres gauge, but higher pressures within the aforementioned range are also advantageous in the instant process as compared with previously employed processes at the same pressures but different pH ranges, catalysts, etc. Completion of the desired hydrogenation is indicated when absorption of hydrogen ceases, contact with the hydrogen being preferably continued for a further period to insure completion of this reaction.

The following examples in which parts are by weight unless otherwise indicated are illustrative of the instant invention and are not to be regarded as limitative.

*Example 1*

Four grams (solids content) of Raney nickel and 1.3 g. of copper acetate are stirred with 480 g. (2.0 moles) of 35.0% aqueous butynediol solution for 1 hour. The solution is brought to pH 11.0, which requires 80 ml. of 1 N sodium hydroxide, and then hydrogenated immediately.

After 12 hours in a rocking autoclave at 40° C. and 5 atmospheres gauge of hydrogen, absorption of hydrogen is complete and the mix is rocked for 3 hours additional under these conditions. The autoclave is then flushed with nitrogen and discharged. The solution is filtered and the filtrate distilled. After removal of lower boilers, 160.2 g. (89%) of butanediol, S.P. (Solidification Point) 18.6° C., $N_D^{25}$ (Index of Refraction) 1.4446 is obtained. On redistilling and cutting out the last small fraction, 153 g. (85%) of water-white material, S.P. 19.9° C., $N_D^{25}$ 1.4445 is obtained.

*Example 2*

This is run like Example 1, but at pH 10, which requires 45 ml. of 1 N sodium hydroxide.

The yield is 155 g. (86%), S.P. 17.1° C., $N_D^{25}$ 1.44448. On fractional distillation there is a substantial forerun of higher refractive index, before pure butanediol is obtained.

*Example 3 (comparative)*

This is run like Example 1, but at the ambient pH (5.0).

The yield is 84% of crude material, S.P. 13.3° C. and $N_D^{25}$ 1.4460. It is extremely difficult to purify by means of fractional distillation.

*Example 4*

480 g. of 35.0% aqueous butynediol solution is adjusted to pH 10.5 by addition of 1 N sodium hydroxide solution, and to the solution is added 2.0 g. of copper acetate and 4.0 g. (solids content) of Raney nickel. The resulting mixture is immediately subjected to hydrogenation in a rocking autoclave at 50° C. under 5 atmospheres gauge of hydrogen pressure. Absorption of hydrogen is complete after 18 hours, the mix being rocked under these conditions for an additional 3 hours. After working up as in Example 1, an 84% yield of water-white material, S.P. 18.5° C., is obtained. Pure butanediol has a solidification point of about 20.9° C. and a refractive index of about 1.4446.

*Example 5*

507 g. of 34% aqueous butynediol solution is adjusted to pH 11 with 68 ml. of 1 N sodium hydroxide solution. 4.0 g. (solids content) of Raney nickel is added and the mixture hydrogenated as described in Example 1. Hydrogenation requires 26 hours to completion. After working up as in Example 1, a 78% yield of butanediol, S.P. +17.8° and $N_D^{25}$ 1.4458 is obtained.

This invention has been disclosed with respect to certain preferred embodiments, and there will become obvious to persons skilled in the art various modifications, equivalents or variations thereof which are intended to be included within the spirit and scope of this invention.

I claim:

1. A process for the catalytic hydrogenation of 1,4-butynediol to 1,4-butanediol comprising admixing an aqueous solution of 1,4-butynediol with a nickel catalyst and treating the resulting mixture at an alkaline pH with hydrogen at a temperature of about 15 to 120° C. and a pressure of about 0 to 30 atmospheres gauge until the 1,4-butynediol has been hydrogenated to 1,4-butanediol.

2. A process as defined in claim 1 wherein a Raney-type nickel catalyst is employed.

3. A process for the catalytic hydrogenation of 1,4-butynediol to 1,4-butanediol comprising admixing an aqueous solution of 1,4-butynediol with a nickel catalyst carrying about 3 to 25% of copper by weight of the nickel catalyst, and treating the resulting mixture at an alkaline pH with hydrogen at a temperature of about 15 to 120° C. and a pressure of about 0 to 30 atmospheres gauge until the 1,4-butynediol has been hydrogenated to 1,4-butanediol.

4. A process as defined in claim 3 wherein the nickel catalyst is a Raney-type nickel catalyst.

References Cited in the file of this patent

UNITED STATES PATENTS

| 2,157,365 | Vaughn | May 9, 1939 |
| 2,319,707 | Reppe et al. | May 18, 1943 |
| 2,335,795 | Reppe et al. | Nov. 30, 1943 |
| 2,737,534 | Taylor et al. | Mar. 6, 1956 |

FOREIGN PATENTS

| 508,944 | Great Britain | June 26, 1939 |
| 869,053 | Germany | Mar. 2, 1953 |

OTHER REFERENCES

Campbell et al.: Chemical Reviews, vol. 31, pp. 145–51 (1942).